United States Patent [19]

Brown et al.

[11] 4,126,056

[45] Nov. 21, 1978

[54] CONTROL LEVER ASSEMBLY

[75] Inventors: William J. Brown, Naperville; Orson K. Kelly, Aurora, both of Ill.

[73] Assignee: Caterpillar Tractor Co., Peoria, Ill.

[21] Appl. No.: 814,594

[22] Filed: Jul. 11, 1977

[51] Int. Cl.² ............................................. G05G 1/00
[52] U.S. Cl. ................................................... 74/491
[58] Field of Search .................. 74/491, 519, 523, 479

[56] References Cited

U.S. PATENT DOCUMENTS

| | | | |
|---|---|---|---|
| 887,180 | 5/1908 | Barnes | 74/491 X |
| 1,117,385 | 11/1914 | Huff | 74/491 |
| 2,315,260 | 3/1943 | Lancaster | 74/479 |
| 2,761,332 | 9/1956 | Gray et al. | 74/801 X |

*Primary Examiner*—Allan D. Herrmann
*Attorney, Agent, or Firm*—Wegner, Stellman, McCord, Wiles & Wood

[57] ABSTRACT

A control lever assembly wherein a plurality of levers are swingably mounted on a common shaft which is mounted in the housing of the unit. The assembly further includes interconnecting structure associated with the levers and associated apparatus connected to the links. The components are subassembled and tested prior to the placement of the assembly on a machine, such as a tractor, as a packaged unit.

9 Claims, 3 Drawing Figures

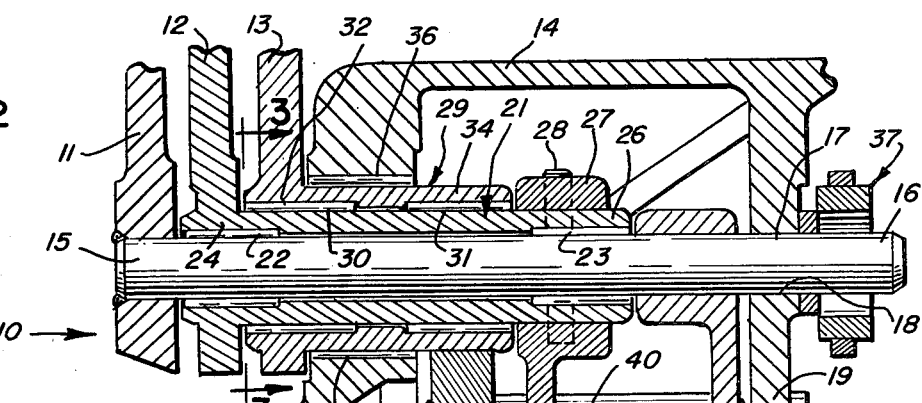
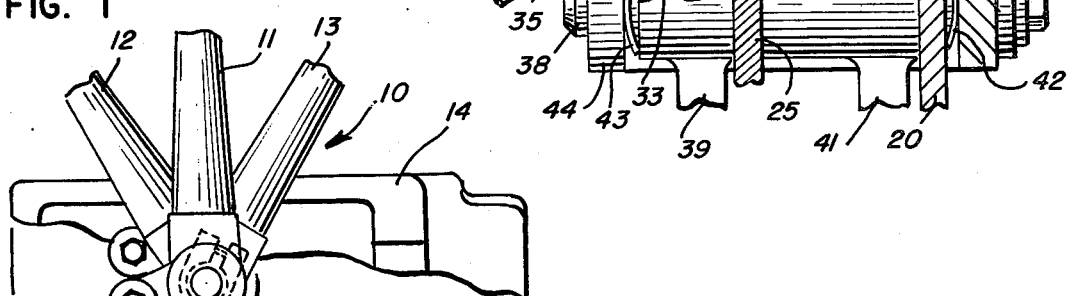
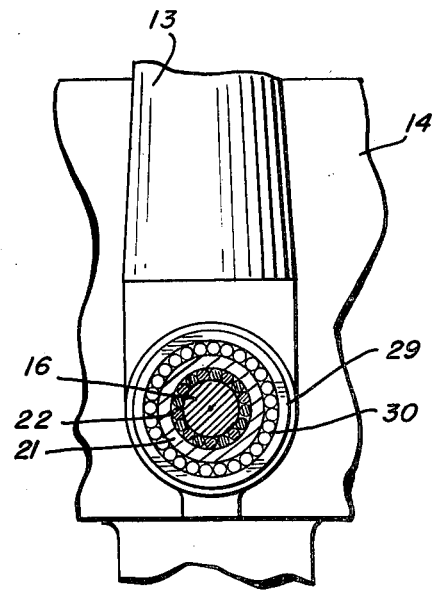

CONTROL LEVER ASSEMBLY

BACKGROUND OF THE INVENTION

1. Field of the Invention

This invention relates to control assemblies, and in particular to control lever assemblies.

2. Description of the Prior Art

In vehicles, such as material handling vehicles including loaders and the like, a plurality of control levers are utilized to effect different operations of the working elements of the vehicle. It is then conventional to provide means for mounting the control levers in adjacency for facilitated use by the operator.

However, in the conventional mounting of the control levers, a plurality of pivotal mounting means have been provided with the control levers being independently mounted, although at times on a common support. The provision of a plurality of such pivotal mounting means is relatively expensive and, thus, has presented a problem in the construction of such vehicles.

Further, it is desirable to associate with the control levers a number of the elements controlled thereby, such as the pilot valves, solenoid valves, etc., of the apparatus.

SUMMARY OF THE INVENTION

The present invention comprehends an improved control lever assembly wherein the apparatus may be subassembled and installed on the vehicle as a packaged unit.

The invention further comprehends the provision of a control lever assembly wherein a plurality of levers are mounted for rotation about a common axis defined by a rotary shaft to which a first of the levers is connected.

In the illustrated embodiment, the other levers are successively concentrically mounted about the first lever shaft. Thus, a single pivotal mounting means of the assembly to the housing may be utilized to effect mounting of the plurality of pivotal mounting means of the individual levers.

Connecting means may be employed between the levers and the mechanisms intended to be operated by manipulation of the levers, and the assembly thereof may be provided as a packaged unit for facilitated installation in the vehicle. Further, the provision of such a packaged unit permits the pretesting thereof prior to installation in the vehicle for facilitated construction of the vehicle.

More specifically, in the illustrated embodiment, the control lever assembly includes a first shaft, first mounting means for mounting the first shaft to the support for rotation about the axis thereof, a first lever connected to the second shaft for manually rotating the first shaft about the axis, a tubular second shaft, second mounting means for mounting the second shaft coaxially to the first shaft for independent rotation of the second shaft about the axis, a tubular third shaft, third mounting means for mounting the third shaft coaxially to the second shaft for independent rotation of the third shaft about the axis, a third lever connected to the third shaft for manually rotating the third shaft for rotation about the axis, and connecting means extending between the shafts and the mechanisms for operating the mechanisms selectively as a result of selective rotation of the shafts by selective manipulation of the levers.

Thus, the control lever assembly of the present invention is extremely simple and economical of construction while providing the highly desirable advantages discussed above.

BRIEF DESCRIPTION OF THE DRAWING

Other features and advantages of the invention will be apparent from the following description taken in connection with the accompanying drawing wherein:

FIG. 1 is a fragmentary vertical elevation of a control lever assembly embodying the invention;

FIG. 2 is a diametric section thereof; and

FIG. 3 is a transverse section taken substantially along the line 3—3 of FIG. 2.

DESCRIPTION OF THE PREFERRED EMBODIMENT

In the exemplary embodiment of the invention as disclosed in the drawing, a control lever assembly generally designated 10 is shown to include three manually operable operator levers 11, 12 and 13. The levers extend outwardly from a housing 14 for suitable manipulation by the operator of the vehicle.

Referring more specifically to FIG. 2, lever 11 is fixedly secured to one end 15 of a shaft 16 having its opposite end 17 journaled in a hole 18 in a wall portion 19 of the housing 14.

Fixed to shaft end 17 adjacent wall 19 is a first connecting link 20.

Concentrically surrounding shaft 16 inwardly of end 15 is a tubular second shaft 21 which is journaled on shaft 16 by suitable needle bearings 22 and 23. Lever 12 is fixedly connected to shaft 21 at one end 24 thereof, and a second connecting link 25 is connected to the other end 26 of the shaft 21 by suitable clamping means, including nut 27 and clamping stud 28.

A third tubular shaft 29 is concentrically mounted about shaft 21 by means of needle bearings 30 and 31 to extend inwardly from adjacent lever 12. Third operating lever 13 is secured to one end 32 of shaft 29 and a third connecting link 33 is secured to the other end 34 of the shaft 29.

Third tubular shaft 29 is journaled by means of needle bearings 35 in a portion 36 of housing 14. Thus, shaft 16 is effectively journaled through bearings 22 and 23, shaft 21, bearings 30 and 31, shaft 29, and bearings 35 in the housing portion 36 to provide a positive rotational support of each of the three shafts 16, 21 and 29 in concentric relationship within the housing portion 36.

A spherical self-aligning bearing generally designated 37 is secured to the end 17 of shaft 16 upon assembly of the control levers as discussed above to provide a second support bearing for the assembly. As shown in FIG. 2, the bearing 37 effectively mounts the shaft end 17 rotatably to the housing wall 19.

The control lever assembly, as shown in FIG. 2, may further include a shaft 38 carrying a bell crank 39. A spacer 40 is provided between the bell crank 39 and a second bell crank 41. A thrust washer 42 may be provided at one end of the bell crank assembly adjacent housing wall 19 and a second thrust washer 43 may be provided at the opposite end of the assembly adjacent a flange 44 of the housing 14.

In the illustrated embodiment, bell crank 39 is connected to connector 25 and bell crank 41 is connected to connector 20.

As shown in FIG. 1, the control levers 11, 12 and 13 are associated in the assembly 10 with a number of mechanisms illustratively comprising mechanisms 45 and 46. As indicated briefly above, the mechanisms may comprise any suitable apparatuses intended to be controlled by manipulation of the levers 11, 12 and 13 and illustratively may comprise pilot valves, solenoid valves, etc. The particular mechanisms controlled by the levers form no part of the present invention and are illustrated as exemplary only as a portion of a complete packaged unit which may be installed in the vehicle with the operating levers associated therewith as discussed above.

Thus, the present invention comprehends an improved control lever assembly wherein the first shaft 16 is mounted to the support housing 14 by a suitable means for rotation of the shaft about a fixed axis thereof. The first control lever 11 is connected to the shaft 16 for manually rotating the shaft about that axis. The second shaft comprises a tubular shaft which is mounted to the first shaft for coaxial rotation thereabout as a function of manipulation of the second lever 12.

The third shaft comprises a tubular shaft mounted coaxially about the second shaft for independent rotation thereof under the control of the third manually operable lever 13. The invention comprehends the provision of connecting means extending between the shafts and the different mechanisms carried by the housing 14 for operating the mechanism selectively as a result of selective rotation of the shaft by selective manipulation of the control levers 11, 12 and 13 by the operator. The housing includes a suitable opening through which the levers may be extended, as seen in FIG. 1.

The mounting means for the shafts may comprise a plurality of different roller bearing means, and more specifically, may comprise needle bearing means, bushing means such as Tefloncoated plastic bushing means, etc., for providing improved rotational support of the shaft in the control assembly.

In the illustrated embodiment, the control lever assembly and the mechanisms are assembled as a packaged unit for bench testing prior to installation in the machine as a pretested packaged unit.

As further illustrated in the disclosed embodiment, the levers are provided at one end of the common support shaft for facilitated and accurate disposition thereof for use by the operator.

The foregoing disclosure of specific embodiments is illustrative of the broad inventive concepts comprehended by the invention.

The embodiments of the invention is which an exclusive property or privilege is claimed are defined as follows:

1. In a manually operable machine having a plurality of selectively operable mechanisms, and a support, an improved control lever assembly comprising:
   a first shaft;
   first mounting means for mounting a first portion of said first shaft to said support for rotation about the axis thereof;
   a first lever connected to said first shaft for manually rotating said first shaft about said axis;
   a tubular second shaft;
   second mounting means for mounting said second shaft coaxially about said first shaft for independent rotation of said second shaft about said axis;
   a second lever connected to said second shaft for manually rotating said second shaft about said axis;
   a tubular third shaft;
   third mounting means for mounting said third shaft coaxially about said second shaft for independent rotation of said third shaft about said axis;
   a third lever connected to said third shaft for manually rotating said third shaft for rotation about said axis;
   fourth mounting means for mounting said third shaft to said support at a position spaced axially from said first portion of the first shaft, said control lever assembly being rotatably supported by the rotatable mounting of each of different shafts thereof to a single one of different axially spaced portions of the support; and
   connecting means extending between said shafts and said mechanisms for operating said mechanisms selectively as a result of selective rotation of said shafts by selective manipulation of said levers.

2. The machine structure of claim 1 wherein said support comprises a housing enclosing said shafts and have an opening through which said levers movably extend.

3. The machine structure of claim 1 wherein said mounting means comprise roller bearing means.

4. The machine structure of claim 1 wherein said support means comprise needle bearing means.

5. The machine structure of claim 1 wherein said mechanisms are mounted to said support.

6. The machine structure of claim 1 wherein said support comprises a housing enclosing said shafts and have openings through which said levers movably extend, said mechanisms being mounted to said support whereby said control lever assembly and said mechanisms may be assembled as a packaged unit for bench testing prior to installation in the machine as a pretested packaged unit.

7. The machine structure of claim 1 wherein said support defines a first pivot means for journaling said first shaft and second pivot means for journaling said third shaft, said first shaft being effectively additionally journaled to said support through said second and third shafts.

8. The machine structure of claim 1 wherein said levers are juxtaposed at one end of said first shaft.

9. The machine structure of claim 1 wherein said levers are juxtaposed at one end of said first shaft and said first shaft is journaled in said support at the opposite end of said first shaft.

* * * * *